W. H. FOOT.
FLUID FLOW INDICATOR.
APPLICATION FILED DEC. 29, 1914.
1,278,902.
Patented Sept. 17, 1918.
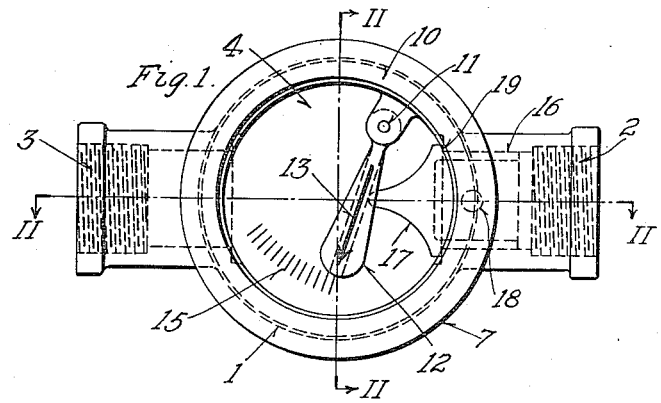
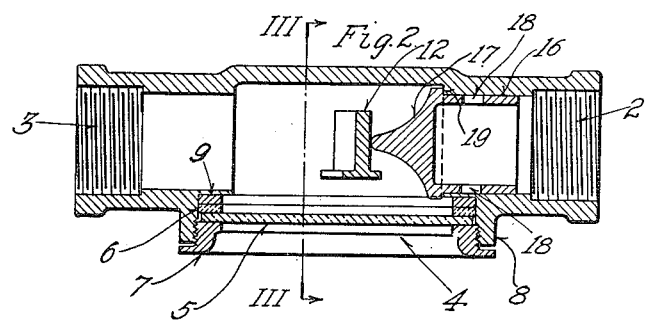
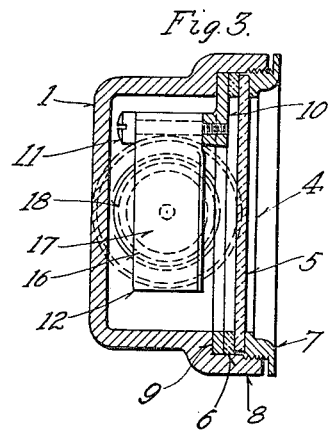
WITNESSES:
S. L. Armstrong
R. D. Brown
INVENTOR
William H. Foot.
BY
Wesley G. Carr
ATTORNEY

UNITED STATES PATENT OFFICE.

WILLIAM H. FOOT, OF EDGEWOOD, PENNSYLVANIA, ASSIGNOR TO WESTINGHOUSE ELECTRIC AND MANUFACTURING COMPANY, A CORPORATION OF PENNSYLVANIA.

FLUID-FLOW INDICATOR.

1,278,902. Specification of Letters Patent. Patented Sept. 17, 1918.

Application filed December 29, 1914. Serial No. 879,549.

*To all whom it may concern:*

Be it known that I, WILLIAM H. FOOT, a subject of the King of Great Britain, and a resident of Edgewood, in the county of Allegheny and State of Pennsylvania, have invented a new and useful Improvement in Fluid-Flow Indicators, of which the following is a specification.

My invention relates to fluid-flow indicators of the type in which the rate of flow of fluids in pipes is rendered visible by means of a swinging member disposed in the path of the fluid and adapted to be deflected thereby.

The object of my invention is to provide a simple, effective and automatically-operated fluid-flow indicator that is adapted to indicate the rate of flow of highly viscous and slowly moving liquids as well as fluids which are lighter and which move with considerable speed.

Of the accompanying drawings, which illustrate one embodiment of my invention, Figure 1 is a front elevational view of an indicator constructed in accordance with my invention. Fig. 2 is a longitudinal sectional view taken substantially along the line II—II of Fig. 1, and Fig. 3 is a transverse sectional view taken substantially along the line III—III of Fig. 2.

The device shown in the drawings comprises a casing 1, of generally circular form, provided with screw-threaded inlet and outlet tubular projections 2 and 3 and with a circular lateral opening 4 for permitting observation of the interior of the casing. The opening 4 is closed by means of a window 5, of transparent material, which is confined between a ring 6 of packing material and an externally screw-threaded ring 7 which engages screw threads formed within a circular flange 8 of the casing 1. Between the ring 6 and a shoulder 9 formed in the casing 1 is a supporting ring 10 to which is pivotally secured, as by means of a screw 11, a swinging flap 12, which may conveniently be of the T-shaped cross section shown in Fig. 2, in which case an arrow 13 may be formed on the side of the flap 12 facing the window 5. By turning the ring 10 with respect to the casing 1, the flap 12 may be caused to assume any desired angular position with relation to the direction of fluid flow through the indicator. A scale 15 may be formed on the window 5 in order to register the approximate rate of fluid flow.

The parts thus far described constitute an indicator which operates satisfactorily if fluid is caused to pass through it with considerable velocity. If, however, such an indicator is inserted in a pipe in which fluid flows very slowly, the fluid will pass around the indicating flap and will not deflect it. Such a condition is found in pipes that supply lubricating liquids to machine bearings, and, in order to adapt the device to such use, I provide means for causing the indicator flap to be deflected before any fluid is permitted to pass through the indicator. In the device shown in the drawings, such means comprises a hollow plunger 16 which is slidably disposed in the inlet tube 2 of the indicator and is provided with an approximately conical end member 17 adjacent to the flap 12. The plunger fits closely within the casing, so that no fluid is permitted to pass around it, and is provided with one or more openings 18. The base of the end member 17 is somewhat larger in diameter than the body of the plunger 16 and constitutes a flange to engage a shoulder 19 formed in the casing, whereby movement of the plunger to the right is limited, as indicated in Figs. 1 and 2.

In the operation of my device, the parts may be assumed to be in the positions shown in Figs. 1 and 2, in which the rounded end of the plunger end member 17 engages the flap 12, while the openings 18 are closed by the walls of the inlet tube 2. If fluid is now supplied, under pressure, through the tube 2, the plunger 16 will be pushed forward by the fluid pressure, and the flap 12 will thereby be deflected until the openings 18 pass beyond the shoulder 19 and are thereby uncovered. The oil or other fluid can then escape through the openings 18 and around the plunger 12 to the outlet tube 3 and the flap, being maintained in its deflected position, will continuously indicate the fact that liquid is flowing through the indicator.

The number, size and position of the openings 18 may be varied in accordance with the nature of the fluid to be supplied to the indicator and in accordance with the desired degree of deflection of the indicator flap. These and other structural modifications may readily be devised without departing from the scope of the appended claims.

I claim as my invention:

1. A fluid-flow indicator comprising a casing, a deflectable indicating member pivotally mounted within the said casing and adapted to be deflected in response to the flow of fluid therethrough by direct contact with the fluid, and means for deflecting the said member before fluid is permitted to flow into the said casing.

2. A fluid-flow indicator comprising a casing, a deflectable indicating member pivotally mounted within the said casing and adapted to be deflected in response to the flow of fluid therethrough by direct contact with the fluid and means for causing the said fluid to deflect the said member to a predetermined degree before fluid is permitted to flow through the said casing.

3. A fluid-flow indicator comprising a casing, a deflectable indicating member pivotally mounted within the said casing and exposed to flow of fluid therethrough and means operated by fluid pressure for deflecting the said member before fluid is permitted to flow through the said casing.

4. A fluid-flow indicator comprising a casing provided with alined inlet and outlet openings, means for permitting inspection of the interior of the said casing, a deflectable indicating flap within the said casing exposed directly to fluid flowing therethrough and a slidable member engaging the said flap and adapted to be moved to deflect the said flap by the pressure of fluid toward the said casing.

5. A fluid-flow indicator comprising a casing having inlet and outlet openings for the passage of fluid, a deflectable member pivotally mounted in the said casing, means for indicating the position of the said deflectable member and means for deflecting the said member in proportion to the pressure of fluid supplied to the said casing and for permitting fluid to flow through the said casing after the said member is deflected.

6. A fluid-flow indicator comprising a casing having inlet and outlet openings for the passage of fluid, a deflectable member pivotally mounted within the said casing, means for indicating the position of the said deflectable member and a plunger disposed in the said inlet opening and adapted to engage the said deflectable member, the said plunger being provided with fluid-conducting means for permitting fluid to pass it when the said member is in a predetermined position.

7. A fluid-flow indicator comprising a casing having inlet and outlet openings for the passage of fluid, a deflectable member pivotally mounted within the said casing, means for indicating the position of the said deflectable member and a hollow plunger slidably disposed in the said inlet opening and provided with an end member adapted to engage the said deflectable member and having an opening for permitting fluid to flow around the said plunger when the latter is sufficiently advanced into the said casing to enable the said opening to communicate with the interior of the said casing.

In testimony whereof, I have hereunto subscribed my name this 18th day of Dec., 1914.

WILLIAM H. FOOT.

Witnesses:
 EDWIN DENHAM,
 B. B. HINES.